(12) United States Patent
Long

(10) Patent No.: US 6,539,084 B1
(45) Date of Patent: Mar. 25, 2003

(54) INTERCOM SYSTEM

(75) Inventor: Timothy Merrick Long, Lindfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 137 days.

(21) Appl. No.: 09/667,325

(22) Filed: Sep. 22, 2000

(30) Foreign Application Priority Data

Sep. 24, 1999 (AU) .............................................. PQ3069

(51) Int. Cl.⁷ .............................. H04M 1/00; H04M 1/64
(52) U.S. Cl. ................. 379/159; 379/88.01; 379/88.03; 379/160
(58) Field of Search ........................... 379/88.01, 88.02, 379/88.03, 69, 159, 160, 165, 167.04

(56) References Cited

U.S. PATENT DOCUMENTS

| | | | | |
|---|---|---|---|---|
| 3,723,654 A | * | 3/1973 | Bunce et al. ................ | 379/159 |
| 4,631,365 A | | 12/1986 | Potter et al. ................ | 379/167 |
| 5,327,114 A | * | 7/1994 | Straate et al. ........... | 340/286.06 |
| 5,598,456 A | * | 1/1997 | Feinberg | |
| 5,612,994 A | * | 3/1997 | Chen ........................... | 379/167 |
| 5,657,380 A | * | 8/1997 | Mozer ......................... | 379/88 |
| 6,310,940 B1 | * | 10/2001 | Ratz ........................ | 379/88.01 |

FOREIGN PATENT DOCUMENTS

| | | | | |
|---|---|---|---|---|
| JP | 63-122339 | 5/1988 | ............ | H04M/1/60 |
| JP | 9-294168 | 11/1997 | ............ | H04M/9/08 |

* cited by examiner

*Primary Examiner*—Binh Tieu
(74) *Attorney, Agent, or Firm*—Fitzpatrick, Cella, Harper & Scinto

(57) ABSTRACT

A method of establishing a private audio communication channel on an intercom system (100) having a plurality of intercom units (101-1 to 101-n), is diclosed. The intercom system 100 is activated by spoken request data input via at least one of the intercom units (101-1 to 101-n). Audio data is transmitted to substantially each of the plurality of intercom units (101-1 to 101-n) in response to the spoken request data. A private audio communication channel is established between at least two of the plurality of intercom units (101-1 to 101-n) in response to spoken reply data input via any one of the plurality of intercom units (101-1 to 101-n).

34 Claims, 6 Drawing Sheets

INTERCOM SYSTEM

FIELD OF THE INVENTION

The present invention relates to intercoms and, in particular, to a computer controlled intercom. The invention also relates to a computer program product including a computer readable medium having recorded thereon a computer program for managing a computer-controlled intercom.

BACKGROUND

Typically intercom systems are not orientated towards ease of use. Most intercoms are merely of a telephony configuration where a calling user must go to an intercom unit and press a button in order to page a person with whom they wish to communicate. The caller's spoken phrase is then broadcast via a plurality of connected intercom units. The person being paged must then stop what they are doing, proceed to the nearest intercom unit and press a button to establish a communication link with the caller. Each time one of the persons speaks, the button on their respective intercom unit must be depressed. Further, their entire conversation is generally broadcast via the other remaining intercom units which are connected to the system.

SUMMARY OF THE INVENTION

It is the object of the present invention to ameliorate one or more of the limitations of the intercom systems described above.

According to one aspect of the present invention there is provided a method of establishing a private audio communication channel on an intercom system having a plurality of intercom units, said method comprising the steps of:

activating said intercom system by spoken request data input via at least one of said intercom units;

transmitting audio data to substantially each of said plurality of intercom units in response to said spoken request data; and establishing a private audio communication channel between at least two of said plurality of intercom units in response to spoken reply data input via any one of said plurality of intercom units.

According to another aspect of the present invention there is provided an intercom system comprising:

a plurality of intercom units each including at least an input means for inputting spoken data; and processor means interconnected with said plurality of intercom units via a communication links wherein said processor means outputs audio data in response to spoken request data received from one of said plurality of intercom units via said communication link, and wherein said processor means establishes a private audio communication channel between at least two of said plurality of intercom units in response to spoken reply data recieved from at least one of said plurality of intercom units via said communication link.

According to still another aspect of the present invention there is provided a computer readable medium, having a program recorded thereon, where the program is configured to make a computer execute a procedure to establish a private audio communication channel on an intercom system having a plurality of intercom units, said program comprising:

code for activating said intercom system by spoken request data input via at least one of said intercom units;

code for transmitting audio data to substantially each of said plurality of intercom units in response to said spoken request data; and code for establishing a private audio communication channel between at least two of said plurality of intercom units in response to spoken reply data input via any one of said plurality of intercom units.

BRIEF DESCRIPTION OF THE DRAWINGS

A number of embodiments of the present invention will now be described with reference to the accompanying drawings in which.

DETAILED DESCRIPTION

Figure 1:
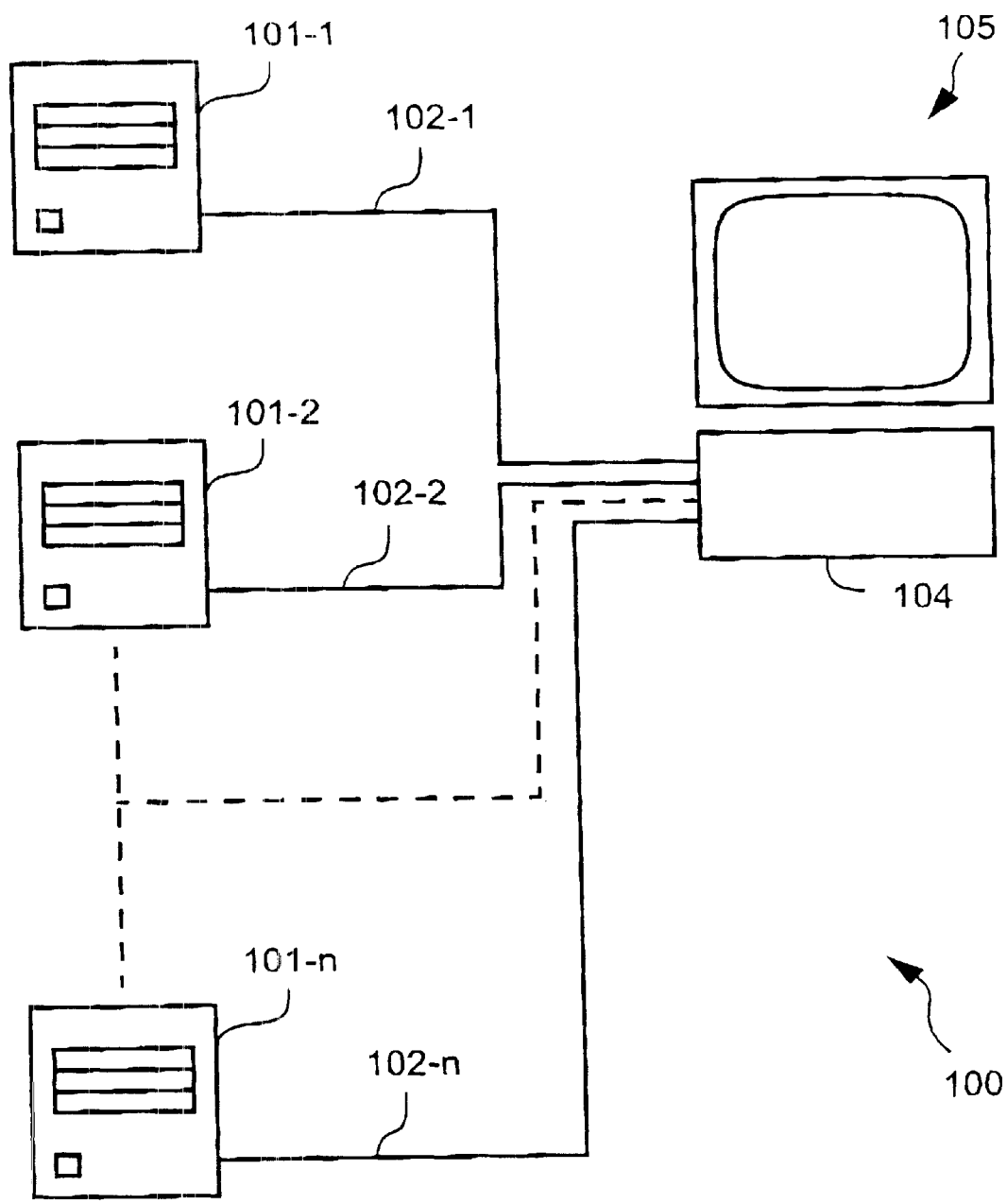
FIG. 1 is a schematic diagram of an intercom system according to a first embodiment of the present invention.

Where reference is made in any one or more of the drawings to steps and/or features, which have the same reference numerals, those steps and/or features are for the purposes of the description the same, unless the contrary appears.

The preferred embodiments provide an intercom system with hands-free voice recognition facilities. These facilities are provided at low cost through the use of a general purpose computer for voice recognition processing.

The first embodiment is illustrated in FIG. 1 and takes the form of an intercom system 100 including a plurality of intercom units 101-1 to 101-n being directly linked to a processor unit 104 of a computer system 105 via wired connections 102-1 to 102-n, respectively. Preferably, a Universal Serial Bus (USB) interface is used to interface to the computer system 105. However, other interface techniques including FireWire, 10BaseT and 100 BaseT are also possible.

The wired connections 102-1 to 102-n are preferably USB wire connections. The USB wire connections preferably carry USB isoc0hronous mode audio data.

Figure 2:
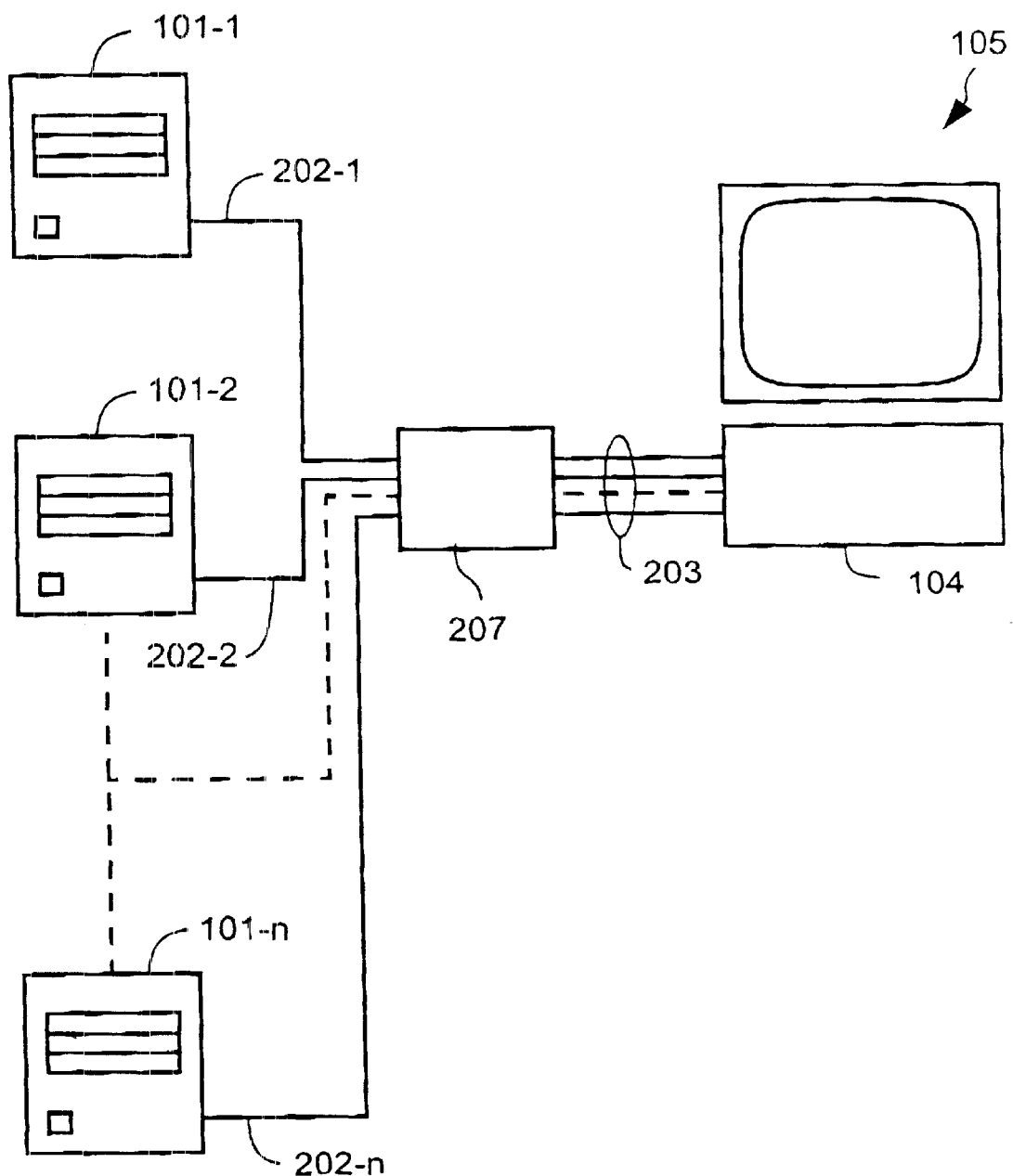
FIG. 2 is a schematic diagram of an intercom system according to a further embodiment of the present invention.

In another embodiment, as seen in FIG. 2, the intercom units 101-1 to 101-n can be directly linked to a USB audio interface device 207 located near the computer system 105. In this instance, wired connections 202-1 to 202-n can be connected between the intercom units 101-1 to 101-n and the USB audio interface device 207 to carry analog data. A USB connection 203 between the audio interface device 207 and the processor unit 104 can carry USB isochronous mode audio data.

In still another embodiment of the present invention, a radio frequency transceiver device (not illustrated) can be used to connect the intercom units 101-1 to 101-n to the processor 104. The Bluetooth wireless standard is an example of a suitable wireless connection.

Figure 6:
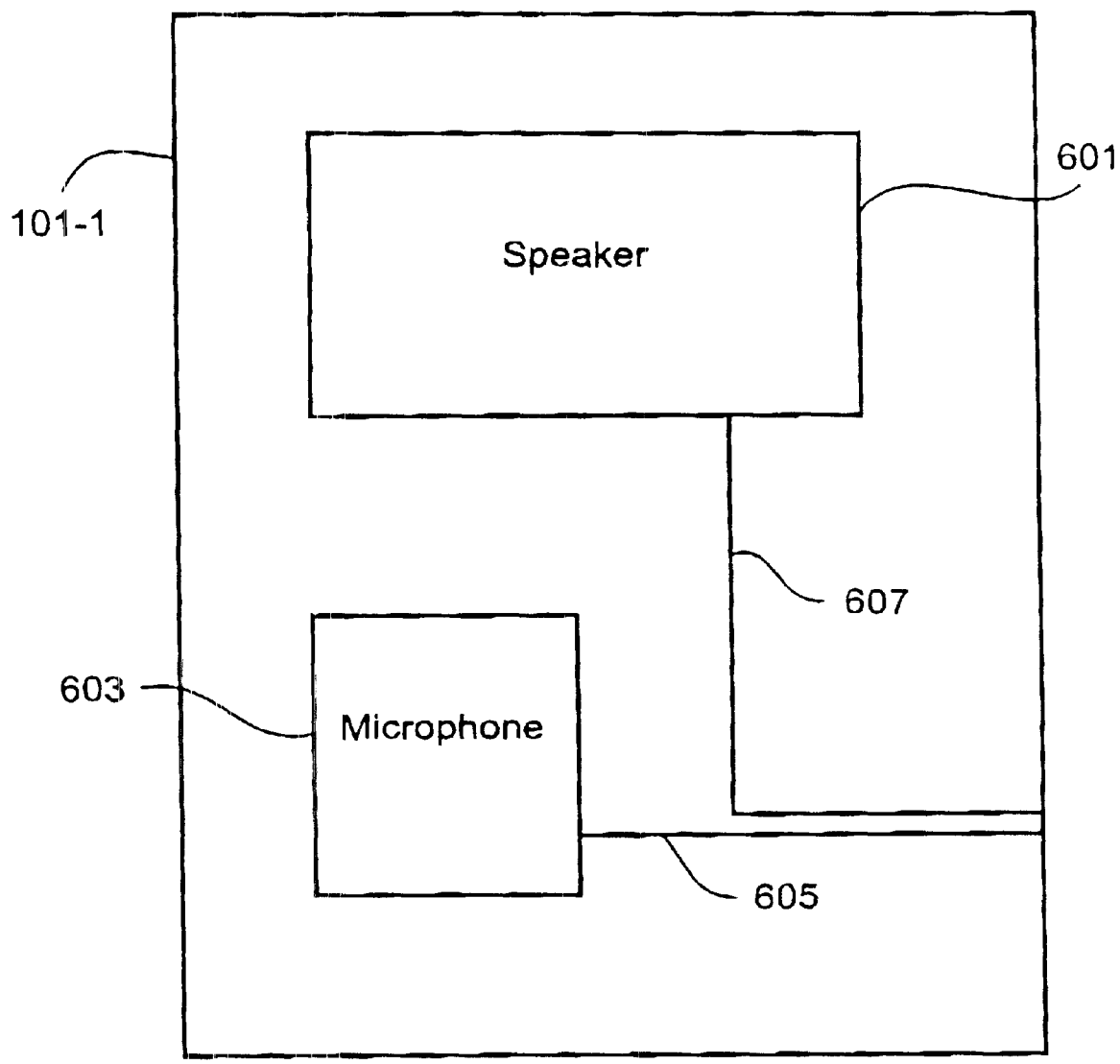
FIG. 6 shows a block diagram of an intercom unit as used in the intercom system of FIGS. 1, 2 and 4.

FIG. 6 shows a block diagram of the intercom unit 101-1 as used in the intercom system 100. The intercom unit 101-1 comprises an audio speaker 601, an audio microphone 603, an output line 605 and an input line 607. The speaker 601 relays any audio signal input to the intercom, via the input line 607, to a user of the system 100. The audio microphone 603 detects any call phrases spoken by the user and outputs them to the system 100, via the output line 605.

Figure 5:
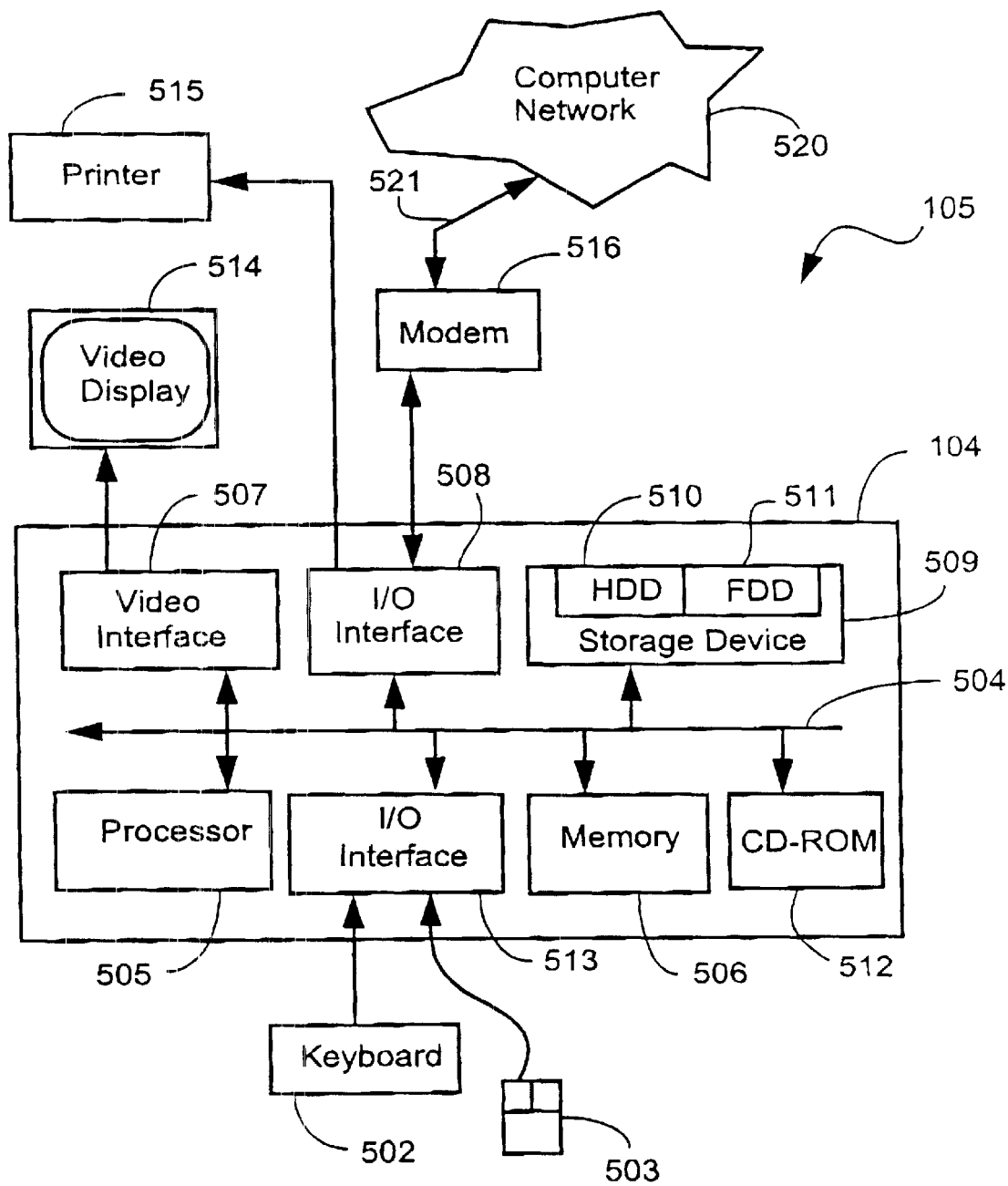
FIG. 5 is a schematic block diagram of a general-purpose computer used in the system of FIGS. 1 and 2.

The computer system 105 is preferably a conventional general-purpose computer, such as the one shown in FIG. 5. The computer system 105 comprises a processor unit 104, input devices such as a keyboard 502 and mouse 503, output devices including a printer 515 and a display device 514. A Modulator-Demodulator (Modem) transceiver device 516 is used by the processor unit 104 for communicating to and from a communications network 520, for example connectable via a telephone line 521 or other functional medium. The modem 516 can be used to obtain access to the Internet, and other network systems, such as a Local Area Network (LAN) or a Wide Area Network (WAN).

The processor unit 104 typically includes at least one processor 505, a memory unit 506, for example formed from semiconductor random access memory (RAM) and read only memory (ROM), input/output (I/O) interfaces including a video interface 507, and an I/O interface 513 for the keyboard 502 and mouse 503 and optionally a joystick (not illustrated), and an interface 508 for the printer 515 and the modem 516. A storage device 509 is provided and typically includes a hard disk drive 510 and a floppy disk drive 511. A magnetic tape drive. (not illustrated) may also be used. A CD-ROM drive 512 is typically provided as a non-volatile source of data The components 505 to 513 of the processor unit 104, typically communicate via an interconnected bus 504 and in a manner which results in a conventional mode of operation of the computer system 500 known to those in the relevant art. Examples of computers on which the embodiments can be practised include IBM-PC's and compatibles, Sun Sparcstations or alike computer systems evolved therefrom.

Figure 3:
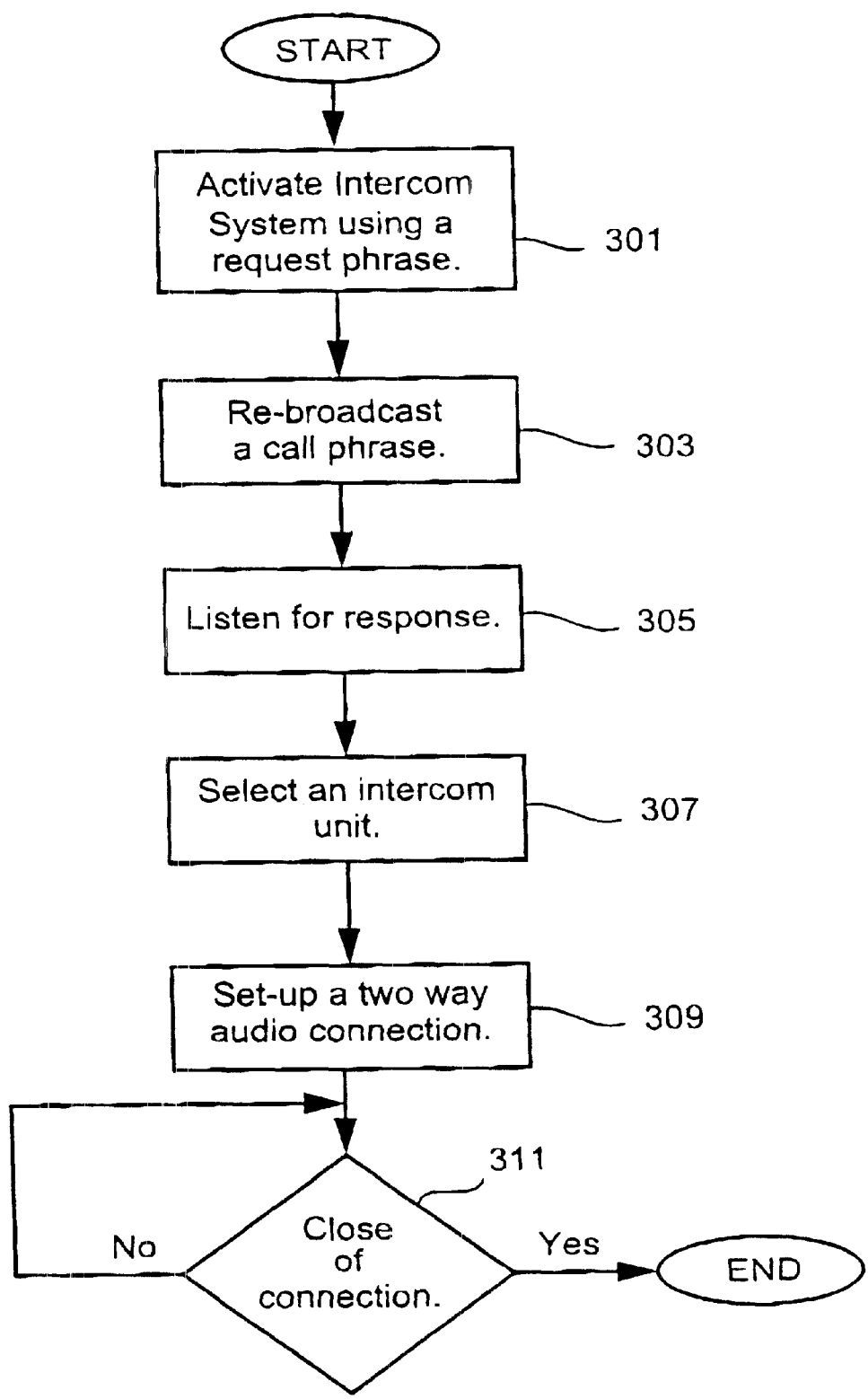
FIG. 3 is a flowchart showing the operation of the intercom system in accordance with the embodiments of the present invention.

FIG. 3 is a flowchart showing the operation of the intercom system 100 in accordance with the embodiments of the present invention. The intercom system 100 is configured so that a user can activate the system 100 by speaking a request phrase. The processor unit 104 preferably comprises a voice recognition module stored in the memory 506. For example, The Microsoft™ Speech Software Development Kit is a suitable voice recognition module. The process begins at step 301, where the intercom system 100 is activated by the user speaking the request phrase into one of the intercom units 101-1 to 101-n. The request phrase spoken by the user preferably contains the name of a person that the user wishes to communicate. At the next step 303, the request phrase is preferably received and recognised by the processor 505 which signals the remaining intercom units to re-broadcast a call phrase containing the name of the person being called. Preferably, the re-broadcasted call is a pre-recorded announcement, whereby the called person's name is inserted by the processor 505 at a particular point in the announcement, For example, the pre-recorded announcement may be "Paging Name, Paging Name", where the called person's name can be inserted by the processor 505. The pre-recorded announcement can be stored in the memory 506 or storage device 509 of computer system 105. In accordance with the example, if the request phrase spoken at step 301 was "calling John Citizen", then the processor 505 would insert the name John Citizen such that the announcement "Paging John Citizen, Paging John Citizen" would be broadcast via the remaining intercom units. Alternatively, the processor 505 can record the request phrase as spoken by the user and replay the request phrase as the re-broadcasted call phrase. The process continues at step 305, where after re-broadcasting the call phrase the remaining intercom units preferably listen for an answering response. At the next step 307, the intercom units 101-1 to 101-n relay any received response to the processor unit 104 and the processor 505 decides which of the remaining intercom units can hear the response most clearly by comparing audio signals from the remaining intercom units. Therefore, the intercom unit with the greatest audio signal is selected. The process continues at step 309, where the selected intercom unit is signalled by the processor 505 and a private two-way audio connection is set up between the selected intercom unit and the intercom unit (hereinafter "originating intercom unit") which initially received the spoken request phrase. The other remaining intercom units preferably no longer participate in the communication once the two-way audio connection has been set up. The process concludes at step 311, where a close of connection signal is received by the processor 505 and the connection between the chosen intercom unit and the originating intercom unit is shut down. The close of connection signal can be sent by either of the participating intercom units and is signalled by a predetermined period of silence from either of the participating intercom units.

Preferably, the processor unit 104 can monitor the audio received from the remaining intercom units after the two-way audio connection has been set up between the chosen intercom unit and the originating intercom unit. In this instance, as and if the audio signal from one of the other remaining intercom units becomes clearer than the audio signal from the currently participating intercom units, audio input will be taken from the clearer intercom unit instead. Preferably, a second two-way audio connection can be set-up between two different users whilst the initial two-way audio connection is being carried on, in accordance with the preferred embodiment of the present invention. In the instance that a second connection is set-up, the two intercom units participating in the first connection will not be involved in the second connection at all.

Figure 4:
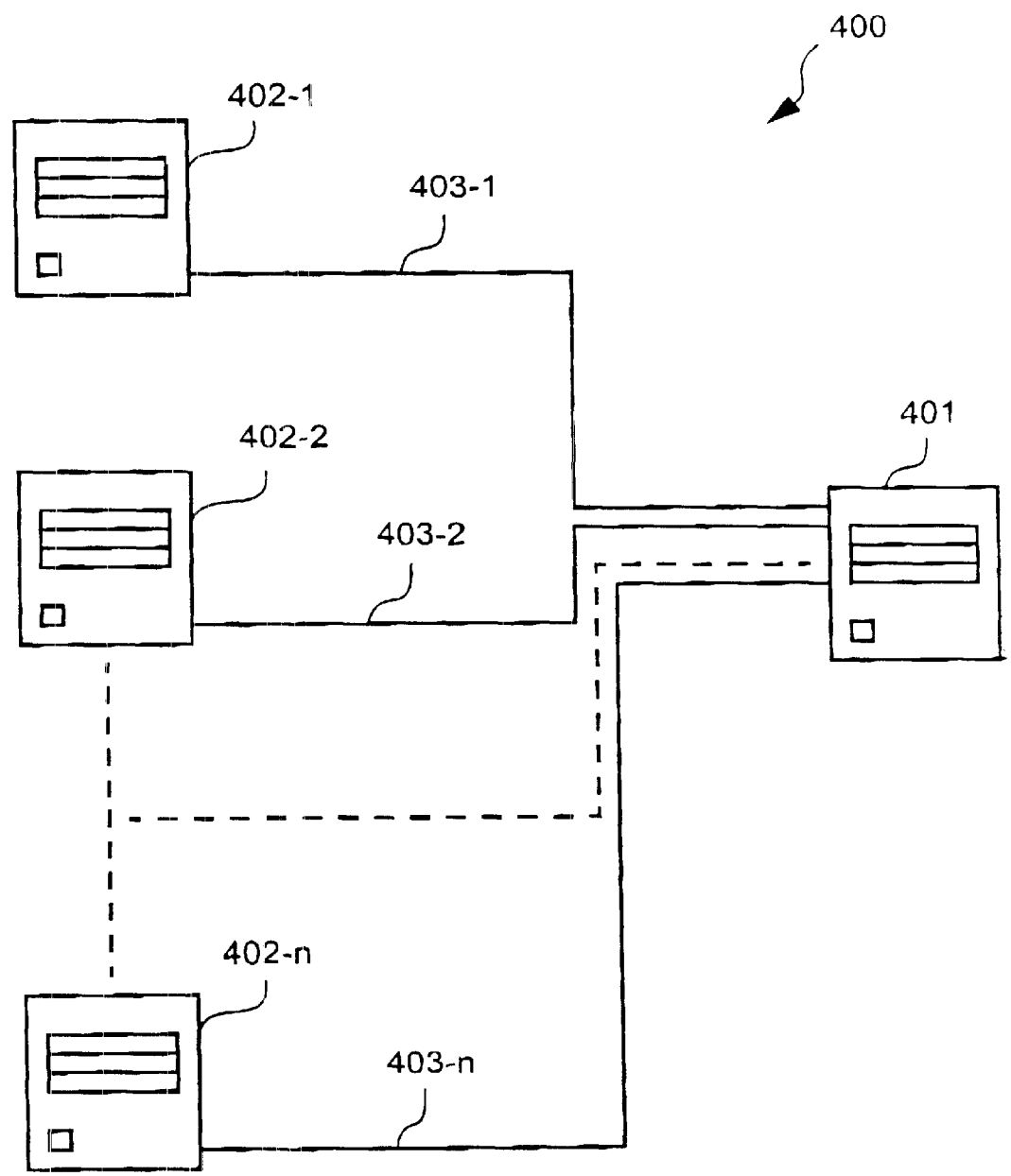
FIG. 4 is a schematic diagram of an intercom system according to still a further embodiment of the present invention.

In still a further embodiment of the present invention an intercom system 400 is provided, which comprises a master intercom station, 401 connected to a plurality of other intercom units 402-1 to 402-n, as shown in FIG. 4. The master intercom station 401 is preferably directly connected to a plurality of other intercom units 402-1 to 402-n, via wires 403-1 to 403-n. Alternatively, a wireless connection, such as that provided by the Bluetooth standard, or any combination thereof can be used to connect the master intercom station 401 to the plurality of other intercom units 402-1 to 402-n. The master intercom station 401 preferably contains sufficient processing capability to perform speech recognition functions and bi-directional audio channel functions. The master intercom station 401 preferably comprises a voice recognition module stored in a memory (not illustrated) located within the master intercom station 401 and a processor (eg. the processor 505 of FIG. 5). The master intercom station 401 preferably also contains additional custom software to carry out the following functions in accordance with the above-described embodiments of the present invention:

(i) listen for activating request phrases from all intercom units 402-1 to 402-n;

(ii) re-broadcast a call phrase to all intercom units 402-1 to 402-n;

(iii) listen for a response of a prescribed form;

(iv) route bi-directional audio data between a chosen intercom unit and the originating intercom unit; and (v) detect a close of connection signal from either of the chosen intercom unit and the originating intercom unit.

The operation of the intercom system 100 in accordance with the embodiments and as shown in FIG. 3, is preferably implemented as software executing on the computer system 105. In particular, the intercom system 100 software can be hosted under Windows™. Windows™ is advantageous since it provides many ancillary features such as plug-and-play installation, hard disks and file systems, network interfaces, scalable fonts, etc. It is important to note that all computation is performed by the processor unit 104 or master intercom station 401.

The software is preferably divided into two separate parts; one part for carrying out the processor unit 104 applications; and another part for performing the intercom functions described above. The software is stored in a computer readable medium, including the storage devices described above, for example. The software is loaded into the computer system 105 from the computer readable medium, and then executed by the computer system 105. A computer readable medium having such software or computer program recorded on it is a computer program product. The use of the computer program product in the computer preferably effects an advantageous apparatus for interacting with the intercom system 100 intercom units in accordance with the embodiments of the invention.

Typically, the application program of the preferred embodiment is resident on the hard disk drive 510 and read and controlled in its execution by the processor 505. Intermediate storage of the program and any data fetched from the network 520 may be accomplished using the semiconductor memory 506, possibly in concert with the hard disk drive 510. In some instances, the application program may be supplied to the user encoded on a CD-ROM or floppy disk and read via the corresponding drive 512 or 511, or alternatively may be read by the user from the network 520 via the modem device 516. Still further, the software can also be loaded into the computer system 500 from other computer readable medium including magnetic tape, a ROM or integrated circuit, a magneto-optical disk, a radio or infra-red transmission channel between the computer module 501 and another device, a computer readable card such as a PCMCIA card, and the Internet and Intranets including e-mail transmissions and information recorded on websites and the like. The foregoing is merely exemplary of relevant computer readable mediums. Other computer readable mediums may be practiced without departing from the scope and spirit of the invention.

Voice recognition is one of the important aspects of the intercom system 100. The processor unit 104 or the master intercom station 401 recognises the name of the person included in the request phrase and selects that name from a library of names for re-broadcasting. The library of names for re-broadcasting can be stored in the memory unit 506 or storage device 509. Voice activation has been shown to be feasible in constrained problem spaces, where the context constrains what can be done, and thus helps to guide interpretation. The intercom system 100 preferably does not use natural language parsing, but instead uses specific key phrases, such as the paged person's name, to drive interaction.

The intercom system 100 can alternatively be implemented in dedicated hardware such as one or more integrated circuits performing the functions or sub functions of FIG. 3. Such dedicated hardware can include graphic processors, digital signal processors, or one or more microprocessors and associated memories.

The foregoing describes only a number of embodiments of the present invention, and modifications, obvious to those skilled in the art, can be made thereto without departing from the scope of the present invention. For example, the intercom units 101-1 to 101-n can include a video monitor (not illustrated) so that a video link can be established between the selected intercom unit and the originating intercom unit, along with the audio connection.

What is claimed is:

1. A method of establishing a private audio communication channel on an intercom system having a plurality of intercom units, said method comprising the steps of:

activating said intercom system by spoken request data input via a first one of said intercom units;

transmitting audio data to substantially each of said plurality of intercom units in response to said spoken request data; and establishing a private audio communication channel between said first intercom unit and at least one other of said plurality of intercom units in response to spoken reply data input via any one of said plurality of intercom units, wherein said at least one other of said plurality of intercom units is selected for said private audio communication channel on the basis of a magnitude comparison of audio signals transmitted by said plurality of intercom units upon said spoken reply data being input.

2. The method according to claim 1, wherein said spoken request data includes the name of a person being called.

3. The method according to claim 1, wherein upon broadcasting said audio data substantially each of said plurality of intercom units listens for said spoken reply data.

4. The method according to claim 1, wherein the at least one other of said plurality of intercom units having the audio signal of the greatest magnitude is selected for said private audio communication channel.

5. The method according to claim 1, wherein said private audio communication channel is closed upon receiving a signal from either of said selected at least one other of said plurality of intercom units or said first intercom unit which initially received said spoken request data.

6. The method according to claim 1, further comprising the step of establishing a video connection between said first intercom unit and said at least one other of said plurality of intercom units.

7. The method according to claim 1, wherein said audio data is matched to said is spoken request data using voice recognition.

8. The method according to claim 1, wherein said plurality of intercom units are hands free-type intercom units.

9. The method according to claim 1, wherein said selected at least one other of said plurality of intercom units transmits an audio signal of greatest magnitude upon said spoken reply data being input.

10. An intercom system comprising:

a plurality of intercom units each including at least an input means for inputting spoken data; and processor means interconnected with said plurality of intercom units via a communication link, wherein said processor means outputs audio data in response to spoken request data received from a first one of said plurality of intercom units via said communication link, and wherein said processor means establishes a private audio communication channel between said first intercom unit and at least one other of said plurality of intercom units in response to spoken reply data received from at least one of said plurality of intercom units via said communication link, wherein said at least one other of said plurality of intercom units is selected for said private audio communication channel on the basis of a magnitude comparison of audio signals transmitted by said plurality of intercom units upon said spoken reply data being input.

11. The system according to claim 10, wherein said processor means comprises voice recognition means for recognizing the spoken request data and outputting data including a recognition result as audio data.

12. The system according to claim 10, wherein said processor means is located within one of said plurality of intercom units.

13. The system according to claim 10, further including a computer comprising said processor means.

14. The system according to claim 10, wherein said communication link is a USB wire connection.

15. The system according to claim 10, wherein said communication link is a wireless communication system.

16. The system according to claim 10, further including an audio interface means.

17. The system according to claim 10, wherein said plurality of intercom units include an audio output means.

18. The system according to claim 17, wherein said audio data is broadcast by said audio output means upon being received by substantially each of said plurality of intercom units.

19. The system according to claim 10, wherein said audio data contains the name of a person being paged.

20. The system according to claim 18 or 19, wherein upon broadcasting said audio data substantially each of said plurality of intercom units listen for said spoken reply data.

21. The system according to claim 10, wherein said processor means selects one of said plurality of intercom units with the audio signal of greatest magnitude.

22. The system according to claim 10, wherein said private audio communication channel is closed by said processor means upon receiving a signal from either of said selected at least one other of said plurality of intercom units or said first intercom unit which initially received said spoken request data.

23. The system according to claim 10, wherein a video link is automatically established between said first intercom unit and said at least one other of said plurality of intercom units.

24. The system according to claim 11, wherein said voice recognition means includes a memory storing a voice recognition program.

25. The system according to claim 10, wherein said plurality of intercom units are hands free-type intercom units.

26. The system according to claim 10, wherein said selected at least one other of said plurality of intercom units transmits an audio signal of greatest magnitude upon said spoken reply data being input.

27. A computer readable medium, having a program recorded thereon, where the program is configured to make a computer execute a procedure to establish a private audio communication channel on an intercom system having a plurality of intercom units, said program comprising:
   code for activating said intercom system by spoken request data input via a first one of said intercom units;
   code for transmitting audio data to substantially each of said plurality of intercom units in response to said spoken request data; and
   code for establishing a private audio communication channel between said first intercom unit and at least one other of said plurality of intercom units in response to spoken reply data input via any one of said plurality of intercom units, wherein said at least one other of said plurality of intercom units is selected for said private audio communication channel on the basis of a magnitude comparison of audio signals transmitted by said plurality of intercom units upon said spoken reply data being input.

28. The computer readable medium according to claim 27, wherein said spoken request includes the name of a person being called.

29. The computer readable medium according to claim 27, wherein upon broadcasting said audio data substantially each of said plurality of intercom units listens for said spoken reply data.

30. The computer readable medium according to claim 27, wherein said private audio communication channel is closed upon receiving a signal from either of said selected at least one other of said plurality of intercom units or said first intercom unit which initially received said spoken request data.

31. The computer readable medium according to claim 27, said program further comprising code for establishing a video connection between said first intercom unit and said at least one other of said plurality of intercom units.

32. The computer readable medium according to claim 27, wherein said audio data is matched to said spoken request data using voice recognition.

33. The computer readable medium according to claim 27, wherein said plurality of intercom units are hands-free type intercom units.

34. The computer readable medium according to claim 27, wherein said selected at least one other of said plurality of intercom units transmits an audio signal of greatest magnitude upon said spoken reply data being input.

* * * * *

UNITED STATES PATENT AND TRADEMARK OFFICE
CERTIFICATE OF CORRECTION

PATENT NO.      : 6,539,084 B1
DATED           : March 25, 2003
INVENTOR(S)     : Timothy Merrick Long It is certified that error appears in the above-identified patent and that said Letters Patent is hereby corrected as shown below:

<u>Title page,</u>
Item [57], ABSTRACT,
Line 3, "diclosed." should read -- disclosed --.

<u>Column 2,</u>
Line 50, "isoc0hronous" should read -- isochronous --.

<u>Column 3,</u>
Line 30, "data" should read -- data. --.

<u>Column 6,</u>
Line 49, "is" (2$^{nd}$ occurrence) should be deleted.

<u>Column 7,</u>
Line 26, "include" should read -- includes --.

Signed and Sealed this

Twenty-eighth Day of October, 2003

JAMES E. ROGAN
*Director of the United States Patent and Trademark Office*